United States Patent
Miyazaki

[11] Patent Number: 6,131,476
[45] Date of Patent: Oct. 17, 2000

[54] GEAR RATIO SELECTING AND SHIFTING APPARATUS IN A TRANSMISSION

[75] Inventor: Takeshige Miyazaki, Nishio, Japan

[73] Assignee: Aisin Ai Co., Ltd., Nishio, Japan

[21] Appl. No.: 09/282,193

[22] Filed: Mar. 31, 1999

[30] Foreign Application Priority Data

Apr. 1, 1998 [JP] Japan .................... 10-088676

[51] Int. Cl.$^7$ .................................................. F16H 61/28
[52] U.S. Cl. .................................................. 74/335; 92/62
[58] Field of Search .................... 74/335, 473.11; 92/62, 65

[56] References Cited

U.S. PATENT DOCUMENTS

| | | | |
|---|---|---|---|
| 3,312,146 | 4/1967 | Quere et al. | 92/62 X |
| 4,580,457 | 4/1986 | Ishida et al. | 74/335 |
| 4,899,607 | 2/1990 | Stainton | 74/335 |
| 4,928,544 | 5/1990 | Markyvech et al. | 74/335 |
| 5,044,216 | 9/1991 | Steeby et al. | 74/335 |
| 5,138,905 | 8/1992 | Kouno | 74/335 X |
| 5,473,959 | 12/1995 | Lasoen | 74/335 |
| 5,910,068 | 6/1999 | Krauss et al. | 74/335 X |
| 5,992,267 | 11/1999 | Smith et al. | 74/335 X |

FOREIGN PATENT DOCUMENTS

| | | |
|---|---|---|
| 0 310 387 | 4/1989 | European Pat. Off. . |
| 0 403 777 | 12/1990 | European Pat. Off. . |
| 0 477 564 | 4/1992 | European Pat. Off. . |
| 0 802 356 | 10/1997 | European Pat. Off. . |
| WO 97/05410 | 2/1997 | WIPO . |

*Primary Examiner*—Charles A. Marmor
*Assistant Examiner*—Ankur Parekh
*Attorney, Agent, or Firm*—Burns, Doane, Swecker & Mathis, LLP

[57] ABSTRACT

The selecting actuator 16 is an operating member being capable of shifting a selecting lever by way of a neutral position. The shifting actuator 15 is an operating member being capable of shifting a shifting fork by way of the selecting lever 30. A flow controlling means 12 drives the selecting actuator 16 by a controlling hydraulic flow introduced from the hydraulic pressure source. Hydraulic pressure generating means 10,12 supply a hydraulic fluid discharged from the hydraulic pressure source into hydraulic chambers 15A,15B respectively, thereby carrying out a double action of the shifting actuator 15. A high hydraulic pressure is not supplied to the hydraulic chambers 15A,15B.

6 Claims, 5 Drawing Sheets

GEAR RATIO SELECTING AND SHIFTING APPARATUS IN A TRANSMISSION

BACKGROUND OF THE INVENTION

1. Field of the Invention

The present invention relates to a gear ratio selecting apparatus in an automatic transmission (T/M). This apparatus has a synchromesh mechanism.

2. Description of Related Art

PCT Application Unexamined Publication WO 97/05410 discloses a gear ratio selecting apparatus in a transmission. This apparatus controls working force of a hydraulic actuator in response to synchromesh mechanisms, shifting steps, operating modes such as a sports mode and an economy mode, or operational states of the synchromesh mechanisms during shifting operation.

This apparatus disclosed in the publication mainly includes: a shifting actuator for moving a shifting fork; a selecting actuator for moving a selecting lever; a proportional flow regulating valve for controlling a hydraulic fluid flow to be supplied to the shifting actuator and the selecting actuator during shift operation; a changing valve for supplying a hydraulic fluid discharged from a hydraulic pressure source to the proportional flow regulating valves; and a pressure control valve for controlling a hydraulic pressure in response to a position of the selecting lever.

The publication also discloses a technique in which the changing valve has a pressure-controlling function to omit the abovementioned pressure control valve so as to control the working force during the shift operation.

As shown in FIG. 6, the shifting actuator disclosed in the publication has a double acting cylinder equipped with a rod extending in one direction, the hydraulic pressure source supplies a primary pressure "PO" to a hydraulic chamber 1 and it supplies a controlled pressure "P1" to the other hydraulic chamber 2. Since the pressure of the hydraulic chamber 1 is constant, a piston 3 is moved by changing the pressure of the hydraulic chamber 2 in one direction and the other direction. This shifting actuator shown in FIG. 6 has a problem that the piston 3 does not accurately return to a neutral position thereof because of dispersion of the controlled pressure "P1".

In the above-mentioned shifting actuator shown in FIG. 6, a pressure-receiving area "S1" is different from a pressure-receiving area "S2" in the hydraulic chamber 1. Accordingly, even when the apparatus supplies the same hydraulic pressure to both of the hydraulic chambers 1,2, the piston 3 does not return to the neutral position.

Also, the above-mentioned shifting actuator can not obtain a large propulsive force for the piston 3 to move to the left side, since the propulsive force "FL" is smaller than the propulsive force "FR" (FR>FL).

Further, the above-mentioned shifting actuator has a problem in durability, since a high hydraulic pressure, the primary hydraulic pressure "PO", is usually supplied in the hydraulic chamber 1. Increasing durability requires improvement in parts precision, material changes and the like, thereby increasing costs disadvantageously.

SUMMARY OF THE INVENTION

The present invention has been developed in view of the aforementioned circumstances. It is therefore an object of the present invention to provide a gear ratio selecting apparatus in a transmission which is capable of setting an shifting actuator to a neutral position thereof easily.

In one aspect of the present invention, a gear ratio selecting apparatus in an automatic transmission, comprises:

a driving shaft connected to a clutch disk;

an output shaft having shifting gears;

a counter shaft for transmitting a rotation of the driving shaft to at least one of the shifting gears;

a selecting lever for selecting and shifting a shifting fork connected with a fork shaft by a hydraulic pressure generated by a hydraulic circuit having a hydraulic pressure source for generating a hydraulic pressure for operating said selecting lever;

a synchromesh mechanism for engaging with the shifting fork selected by the selecting lever to give a friction force to one of the shifting gears and to synchronize the driving shaft and the output shaft; and the improvement comprising:

a selecting actuator including a double acting cylinder having two hydraulic chambers being capable of operating the selecting lever in one direction and another direction;

a shifting actuator including a double acting cylinder having two hydraulic chambers being capable of operating the shifting fork in one direction and another direction;

a hydraulic pressure generating means for introducing a hydraulic fluid discharged from the hydraulic pressure source to both of the hydraulic chambers of the shifting actuator with a controlled hydraulic pressure so as to operate the shifting actuator in the one direction and the another direction; and a flow-controlling means for driving the selecting actuator by controlling a flow of hydraulic fluid discharged from the hydraulic pressure source.

In the present invention, the shifting actuator is driven with the hydraulic pressure generated by use of the hydraulic pressure generating means; so, the shifting actuator can be controlled by an extensive hydraulic pressure between a low hydraulic pressure and a high hydraulic pressure. The present invention prevents the high hydraulic pressure from being usually supplied to either of the hydraulic chambers of the shifting actuator, and thereby members constituting the shifting actuator is improved in durability.

In the present invention, the synchromesh mechanism in the transmission can be constituted by a sleeve, a synchronizing ring, a synchronizing key, and the like, as it is well-known. The shifting fork is to be engaged with the sleeve so as to move the sleeve automatically or manually, thereby actualizing a shift operation including an exacting-inserting step, a synchronizing step, and a squeezing step in a synchronizing operation.

The shifting actuator can include a double acting cylinder having two hydraulic chambers and a rod extending in one direction. Also, the selecting actuator can include a double acting cylinder having two hydraulic chambers and a rod extending in one direction.

In a preferable aspect, the shifting actuator comprises: (1) a cylinder having a first hydraulic chamber, a second hydraulic chamber, and a stopper portion disposed between the first hydraulic chamber and the second hydraulic chamber; (2) a first piston portion inserted movably in the first hydraulic chamber; (3) a second piston portion inserted movably in the second hydraulic chamber and being constituted separately with respect to the a first piston portion. When a hydraulic pressure is supplied to the second hydraulic chamber, the second piston portion is moved to the first hydraulic chamber to collide with the stopper portion, thereby not entering the first hydraulic chamber. Also, when a hydraulic pressure is supplied to the first hydraulic chamber, the first piston portion approaches the second hydraulic chamber to collide with the second piston portion stopped by the stopper portion, thereby and the shifting actuator is set in a neutral position thereof.

In a preferable aspect, the first piston portion has a large diameter piston portion, and a small diameter piston portion substantially coaxially connected to the large diameter piston portion. Also, the second piston portion has a central hole into which the small diameter piston portion is movably inserted.

In a preferable aspect, an outer diameter of the second piston portion is larger than that of the first piston portion. The large diameter piston portion of the first piston portion has a pressure-receiving area facing the first hydraulic chamber, and the small diameter piston portion of the first piston portion has a pressure-receiving area facing the second hydraulic chamber. In a preferable mode, the pressure-receiving area of said large diameter piston portion of said first piston portion is larger than the pressure-receiving area of the small diameter piston portion of the first piston portion.

The hydraulic pressure source can include a pump, an accumulator, and the like. The hydraulic pressure generating means can preferably include a first controlling valve and a second controlling valve. In a preferable mode, the first controlling valve is to control a hydraulic fluid discharged from the hydraulic pressure source and to supply a controlled hydraulic fluid to one of the hydraulic chambers of the shifting actuator for operating the shifting actuator in the one direction. The second controlling valve is to control a hydraulic fluid discharged from the hydraulic pressure source and to supply a controlled hydraulic fluid to the other of the hydraulic chambers of the shifting actuator for operating the shifting actuator in the other direction.

The apparatus of the present invention can preferably include an automatic deciding means for judging that the shifting actuator is in the exacting-inserting step, the synchronizing step, or the squeezing step in synchronizing operation, and the automatic deciding means can preferably decide a hydraulic pressure of the hydraulic pressure generating means in such a manner that the shifting folk is moved by working force depending on one of the aforementioned steps. The automatic deciding means can be an ECU having a micro computer, thereby controlling a controlling valve having a proportional regulating system.

BRIEF DESCRIPTION OF THE DRAWINGS

A more complete appreciation of the present invention will be readily obtained as the same becomes better understood by reference to the following detailed description when considered in connection with the accompanying drawings and detailed specification, all of which forms a part of the disclosure.

DETAILED DESCRIPTION OF THE PREFERRED EMBODIMENTS

Having generally described the present invention, a further understanding can be obtained by reference to the specific preferred embodiment which are provided herein for purposes of illustration only and are not intended to limit the scope of the appended claims.

Preferred Embodiment

Figure 5:
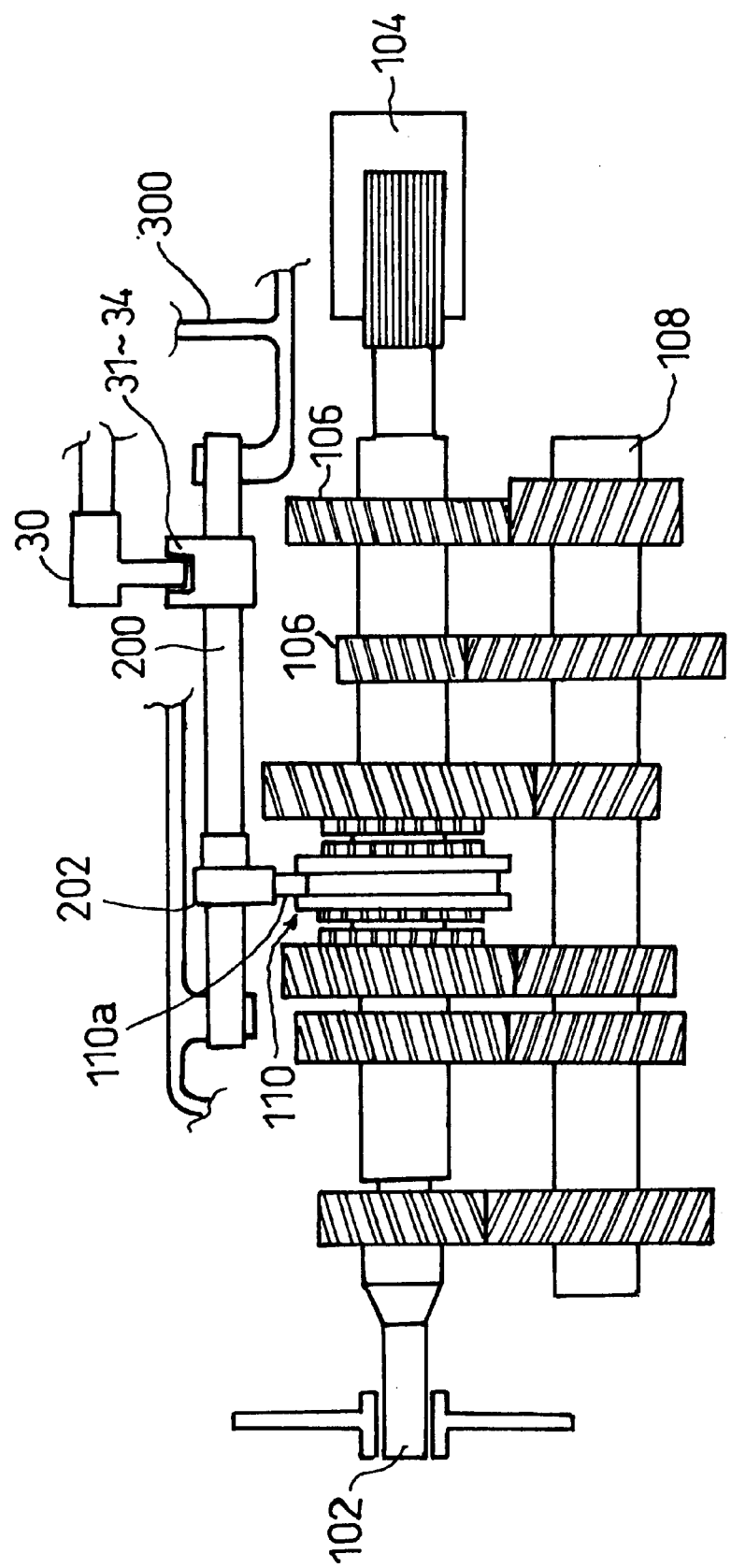
FIG. 5 illustrates the whole construction of the preferred embodiment.

In FIG. 5 showing the whole construction of the preferred embodiment, the apparatus employed in a vehicle transmission includes a driving shaft 102 working as a input shaft, an output shaft 104 having shifting gears 106, a counter shaft 108, a synchromesh mechanism 110 having a sleeve 110a, a selecting lever 30, selecting gate members 31–34 moved by the selecting lever 30, a fork shaft 200 having a shifting fork 202 to be moved by the fork shaft 200, and a transmission case 300.

Figure 1:
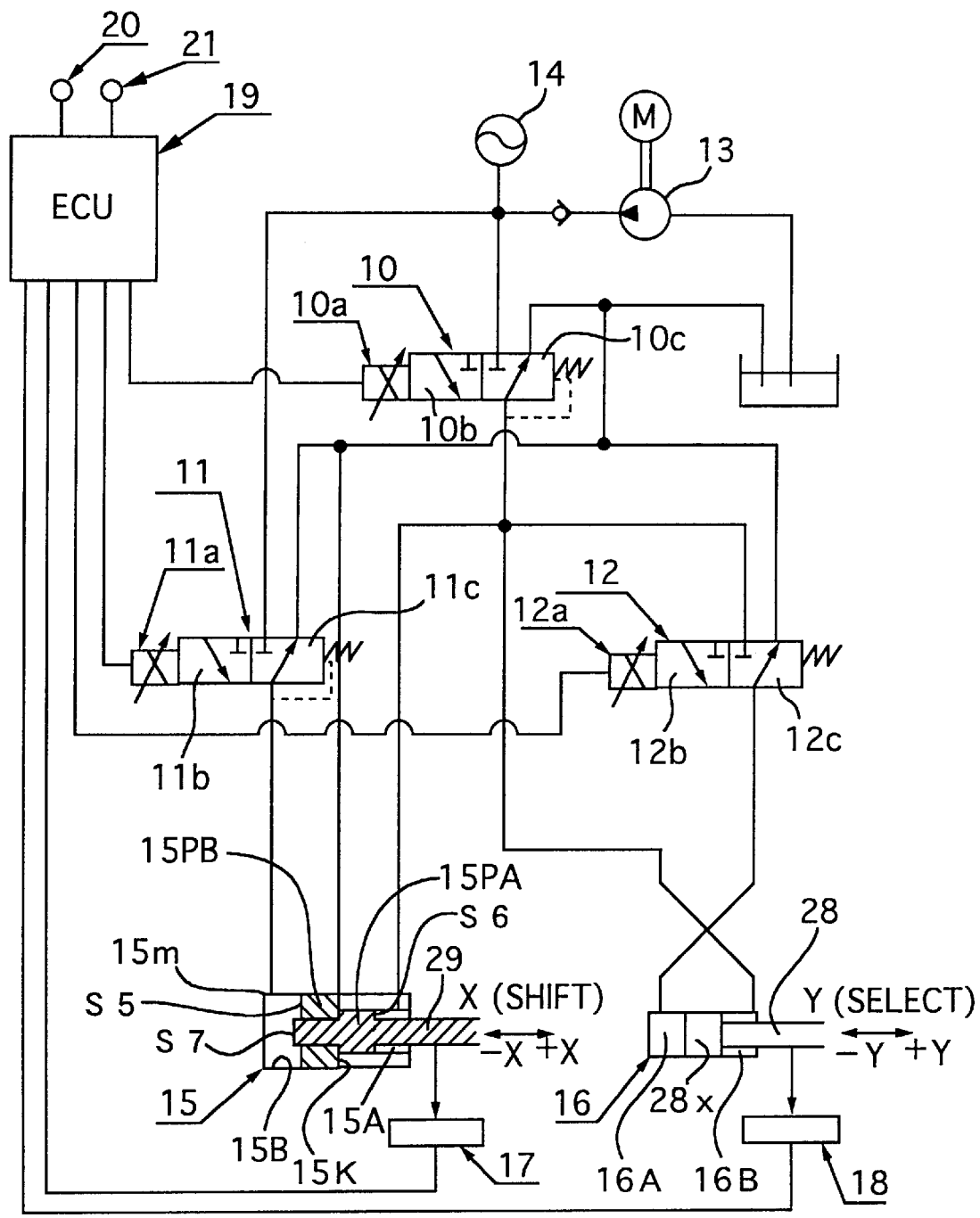
FIG. 1 illustrates a hydraulic circuit of a preferred embodiment of the present invention.
Figure 2:
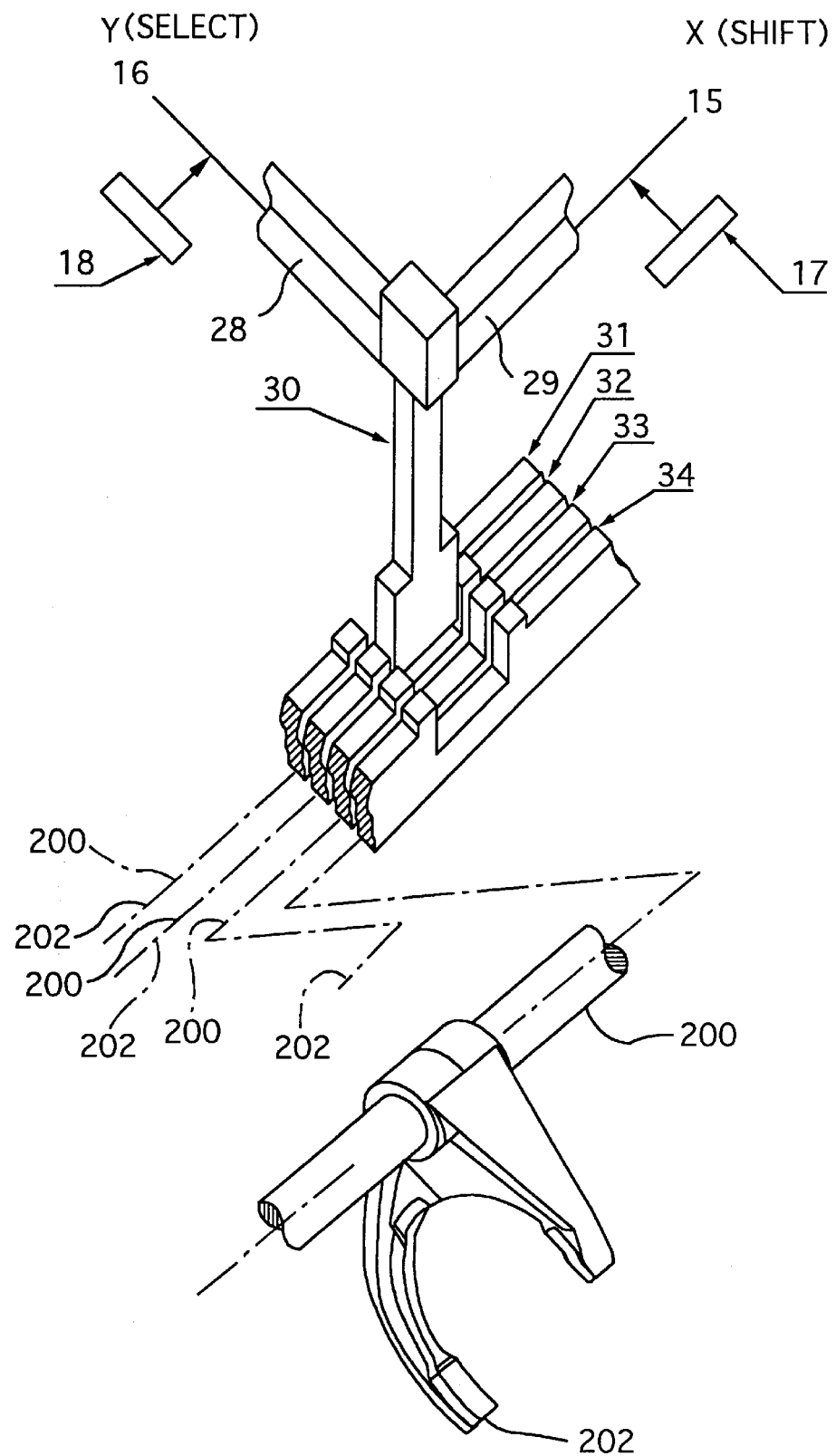
FIG. 2 illustrates a relationship between a shifting rod of a shifting actuator and a selecting rod of the selecting actuator.

In FIGS. 1 and 2, the apparatus of the present embodiment has selecting gate members 31–34 working as a shifting head respectively. A selecting lever 30 is moved in a "Y" direction by a selecting rod 28. The selecting lever 30 is moved in a "X" direction by a shifting rod 29 so as to engage with one of the selecting gate members 31–34 so as to move the shifting fork 202 with the fork shaft 200. When the shifting fork 202 moves, the synchromesh mechanism 110 operates for shift operation.

Figure 3:
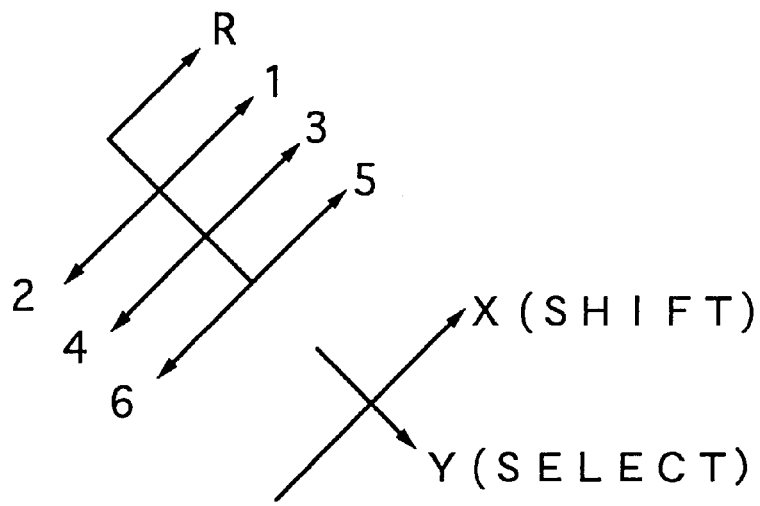
FIG. 3 illustrates schematic shift-steps.

The selecting rod 28 constitutes a piston rod of a selecting actuator 16, as shown FIG. 1. The shifting rod 29 constitutes a piston rod of the shifting actuator 15. The movement of selecting lever 30 can realize six steps in forward operation and one step in reverse operation, as shown in FIG. 3.

In FIG. 1, a hydraulic pressure source includes a pump 13 driven by a motor, and an accumulator 14 for accumulating a hydraulic pressure caused by the pump 13. The hydraulic circuit, operated by the hydraulic pressure source, mainly includes: (1) a two position changing valve 10 for receiving a hydraulic fluid from the hydraulic pressure source; (2) a shifting actuator 15 having the hydraulic chamber 15A into which the hydraulic fluid is supplied from the two position changing valve 10; (3) a flow control valve 12 into which the hydraulic fluid is supplied from the two position changing valve 10; (4) a two position changing valve 11 for supplying the hydraulic fluid from the hydraulic pressure source to a hydraulic chamber 15B of the shifting actuator 15; and (5) a selecting actuator 16 having a hydraulic chamber 16A for receiving the hydraulic fluid from the flow control valve 12 and having a hydraulic chamber 16B for receiving the hydraulic fluid from the two position changing valve 10.

The aforementioned changing valve 10 is to be operated by a solenoid 10a to control its opening degree, constituting a proportional pressure regulating valve having a feed-back function. The aforementioned changing valve 11 is to be operated by a solenoid 11a to control its opening degree, constituting a proportional pressure regulating valve having a feed-back function. The changing valves 10,11 constitute a hydraulic pressure generating means having the first controlling valve and the second controlling valve. In other words, the changing valves 10,11 control the hydraulic pressure of the hydraulic chambers 15A,15B of the shifting actuator 15.

Figure 4:
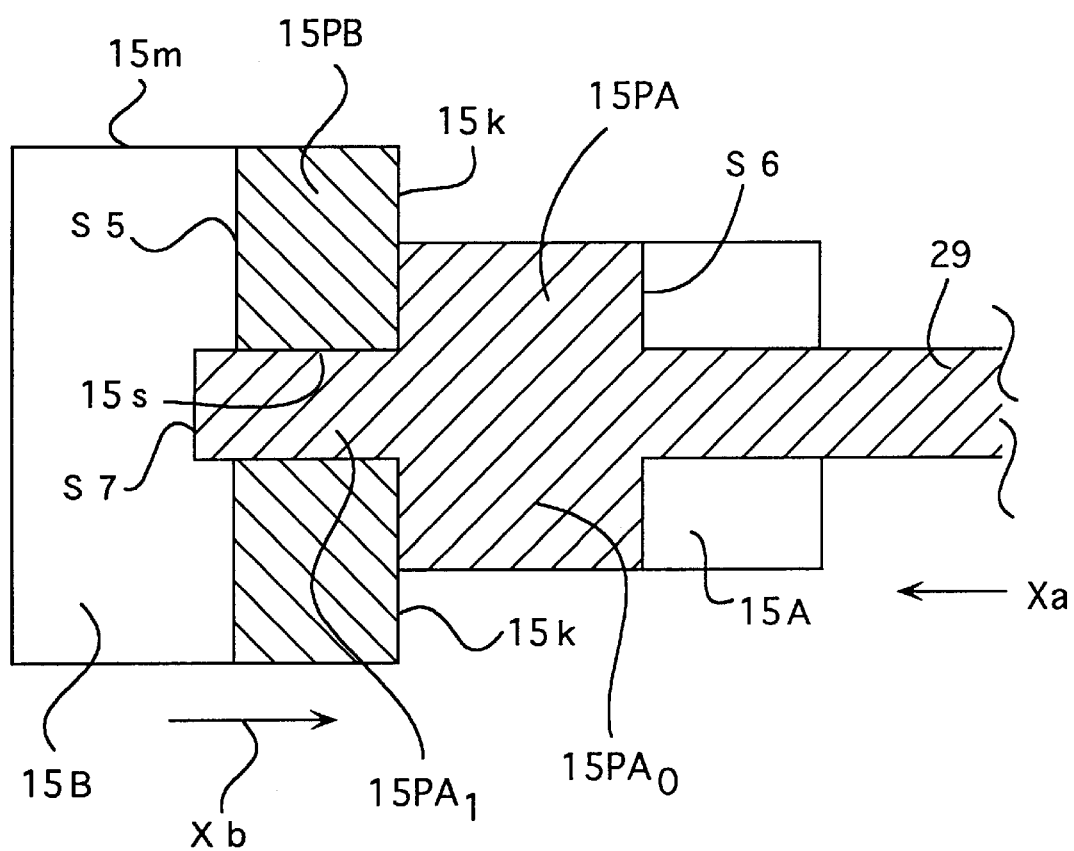
FIG. 4 illustrates a main portion of a shifting actuator.

By the way, as shown in FIG. 4, the aforementioned shifting actuator 15 includes: (1) a cylinder 15m having a first hydraulic chamber 15A, a second hydraulic chamber 15B, and the wall portion 15k disposed between the first hydraulic chamber 15A and the second hydraulic chamber 15B; (2) a first piston portion 15PA having a large diameter piston portion 15PA 0, a small diameter piston portion 15PA 1 coaxially connected to the large diameter piston portion 15PA 0, and the rod 29 coaxially connected to the large diameter portion 15PA 0; (3) a second piston portion 15PB having a central hole 15s and being disposed separately with respect to the first piston portion 15PA. An outer diameter of the second piston portion 15PB is larger than that of the large diameter piston portion 15PA 0. The second piston portion 15PB has a pressure-receiving area "S5" facing the second hydraulic chamber 15B. The large diameter piston portion 15PA 0 has a pressure-receiving area "S6" facing the first hydraulic chamber 15A. The small diameter piston portion 15PA 1 has a pressure-receiving area "S7" facing the second hydraulic chamber 15B. The pressure-receiving area "S6 is larger than the pressure-receiving area "S7". A total area of the pressure-receiving area "S5 and the pressure-receiving area "S7 is larger than the pressure-receiving area "S6".

The small diameter piston portion 15PA 1 is movably inserted into the central hole 15s. The first piston portion 15PA is movably inserted into the first hydraulic chamber 15A. The second piston portion 15PB is movably inserted into the second hydraulic chamber 15B. The wall portion 15k works as a stopper portion with respect to the second piston portion 15PB.

When a hydraulic pressure is supplied to the second hydraulic chamber 15B, the second piston portion 15PB is moved in a direction "Xb" to collide with the wall portion 15k, thereby not entering the first hydraulic chamber 15A. When a hydraulic pressure is supplied to the first hydraulic chamber 15A, the first piston portion 15PA is moved in a direction "Xa" to collide with the second piston portion 15PB stopped by the wall portion 15k, thereby not entering the second hydraulic chamber 15B. As a result, the shifting actuator 15 is set in its neutral position.

The shifting rod 29 is extended from the first piston portion 15PA of the shifting actuator 15. The selecting rod 28 is extended from the piston portion 28x of the selecting actuator 16. As shown in FIG. 2, the selecting rod 28 and the shifting rod 29 cross each other. Thus, a combination of the selecting rod 28 and the shifting rod 29 actualizes one of the selecting gate members 31–34 into shift operation.

There is a ECU 19, an electrical control unit, which controls the changing valves 10,11 and the flow control valve 12. The ECU 19 sends electric signals, generated by use of PWM control of electric current control, to solenoids 10a,11a,12a of the valves 10,11,12, thereby deciding a hydraulic pressure of the hydraulic chambers 15A,15B of the shifting actuator 15 so as to operate the shifting actuator 15 in the "X" direction. The ECU 19 receives output signals from a stroke sensor 17 for detecting a motion of the shifting rod 29. The ECU 19 receives output signals from a stroke sensor 18 for detecting a motion of the selecting rod 28. Also, the ECU 19 receives output signals from a rotational sensor 20 for detecting a rotation of the driving shaft 102, and it receives output signals from a vehicle speed sensor 21, respectively.

In the present embodiment, shift operation is carried out by the ECU 19 which detects shift-volition of a driver or a vehicle speed. The ECU 19 controls the changing valve 10 and the flow control valve 12 for moving the selecting rod 28 of the selecting actuator 16 to a desired position in the "Y" direction. When the selecting rod 28 of the selecting actuator 16 is moved in a "+Y" direction, the ECU 19 sets the valve 10 in an off-state to choose a position 10c, and the ECU 19 sets the flow control valve 12 in an on-state to choose a position 12b. When the selecting rod 28 of the selecting actuator 16 is moved in a "−Y" direction, the ECU 19 sets the valve 10 in an on-state to choose a position 10b, and the ECU 19 sets the flow control valve 12 in an off-state to choose a position 12c. Therefore, the selecting lever 30 is engaged with one of the selecting gate members 31–34.

In the above-mentioned selective operation, the ECU 19 detects a position of the selecting rod 28 by the stroke sensor 18, and thereby the ECU 19 controls the hydraulic fluid flow of the flow control valve 12 in response to a position of the selecting rod 28 and the rotational speed of the driving shaft 102.

When the shifting rod 29 of the shifting actuator 15 is moved, the ECU 19 controls the changing valves 10,11, and thereby it controls hydraulic pressures of the hydraulic chamber 15A,15B by the feed-back control of the changing valves 10,11. When the shifting rod 29 of the shifting actuator 15 is moved in a "+X" direction, the ECU 19 sets the valve 11 in an on-state to choose a position 11b to increase the hydraulic pressure in the second hydraulic chamber 15B. So, the ECU 19 increases a driving force for moving the shifting rod 29 in the "+X" direction.

When the shifting rod 29 of the shifting actuator 15 is moved in a "−X" direction, the ECU 19 sets the valve 10 in an on-state to choose a position 10b to increase the hydraulic pressure in the first hydraulic chamber 15A. So, the ECU 19 increases a driving force for moving the shifting rod 29 in the "−X" direction. In such cases, the ECU 19 controls an electric current of the solenoids 10a,11a and so on.

Figure 6:
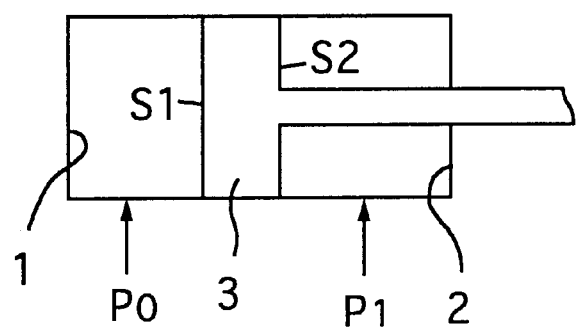
FIG. 6 illustrates a partial portion of a conventional technique.

In the present embodiment, as shown in FIG. 4, the pressure-receiving area "S5" of the second piston portion 15PB is larger than the pressure-receiving area "S6" of the first piston portion 15PA, and the wall portion 15k for colliding with the second piston portion 15PB is disposed at the approximately middle portion of the cylinder 15m. Therefore, the ECU 19 controls the changing valves 10,11 in such a manner so as to simultaneously increase the hydraulic pressures of the first hydraulic chamber 15A and the hydraulic chamber 15B, and thereby the shifting actuator 15 returns to its neutral position quickly and accurately. A conventional technique shown in FIG. 6 requires a complicated control for moving a piston to its neutral position to demand a long time for going to the neutral position. On the other hand, the present embodiment requires a simple control to demand a short time for going to the neutral position.

In other words, as shown in FIG. 4, when the hydraulic pressure is supplied to the second hydraulic chamber 15B, the second piston portion 15PB is moved in the "Xb" direction to collide with the wall portion 15k, thereby not entering the first hydraulic chamber 15A. When the hydraulic pressure is supplied to the first hydraulic chamber 15A, the first piston portion 15PA is moved in the "Xa" direction to collide with the second piston portion 15PB stopped by the wall portion 15k, thereby not entering the second hydraulic chamber 15B. As a result, the shifting actuator 16 is set in a neutral position.

Also, in the transmission of the vehicle, time required for shift operation indicates response ability with respect to a shift-operation carried out by a driver. The better the response ability, the better the driver-feelings in shift operation. Accordingly, a quick shift operation is required in the transmission. So, the present embodiment is more advantageous than the conventional technique in the response ability of the shift operation, since the shifting actuator 15 of the present embodiment returns to the neutral position quickly and accurately.

A position of the shifting rod 29 of the shifting actuator 15 is detected by the stroke sensor 17. On the basis of the output signal detected by the stroke sensor 17, the ECU 19 decides a force required for the exacting-inserting step of the synchromesh mechanism, a force required for a synchronizing step, and a force required for a squeezing step in synchronizing operation. The exacting-inserting step of the synchromesh mechanism is a step in which the sleeve begins to move. The synchronizing step of the synchromesh mechanism is a step in which the sychonizing ring is brought into contact with the shifting gear for synchronization. The squeezing step in the synchromesh mechanism is a step in which the sleeve is engaged with the shifting gear.

When the aforementioned selective operation and shifting operation is finished, the changing valves 10,11 return to the state shown in FIG. 1, the flow control valve 12 returns to the state shown in FIG. 1, thereby stopping the pressure load in each of the hydraulic chambers.

According to the aforementioned construction, since the shifting actuator 15 is operated by the hydraulic pressure of the hydraulic chambers 15A,15B, the primary hydraulic pressure is not usually supplied to either the first hydraulic chamber 15A or the second hydraulic chamber 15B. Thus, the shifting actuator 15 is advantageous in durability and precision of the members constituting the shifting actuator 15.

What is claimed is:

1. A gear ratio selecting apparatus in an automatic vehicle transmission, comprising:

a driving shaft connected to a clutch disk;

an output shaft having shifting gears;

a counter shaft for transmitting a rotation of said driving shaft to at least one of said shifting gears;

a selecting lever for selecting and shifting a shifting fork connected with a fork shaft by a hydraulic pressure generated by a hydraulic circuit having a hydraulic pressure source for generating a hydraulic pressure for operating said selecting lever;

a synchromesh mechanism for engaging with said shifting fork selected by said selecting lever to give a friction force to one of said shifting gears and to synchronize said driving shaft and said output shaft;

a selecting actuator including a double acting cylinder having two hydraulic chambers for operating said selecting lever in one direction and another direction;

a shifting actuator for operating said shifting fork in one direction and another direction, the shifting actuator comprising:

a cylinder having a first hydraulic chamber, a second hydraulic chamber, and a stopper portion disposed between said first hydraulic chamber and said second hydraulic chamber;

a first piston portion inserted movably in said first hydraulic chamber;

a second piston portion inserted movably in said second hydraulic chamber and being constituted separately with respect to said first portion;

wherein when hydraulic pressure is supplied to said second hydraulic chamber, the second piston portion is moved toward said first hydraulic chamber to collide with said stopper portion which prevents the second piston portion from entering said first hydraulic chamber, and when hydraulic pressure is supplied to said first hydraulic chamber while said second hydraulic chamber is pressurized, said first piston portion approaches said the second hydraulic chamber to collide with said second piston portion stopped by said stopper portion, thereby setting said shifting actuator in a neutral position;

hydraulic pressure generating means for introducing a hydraulic fluid discharged from said hydraulic pressure source to both of said hydraulic chambers of said shifting actuator with a controlled hydraulic pressure so as to operate said shifting actuator in said one direction and said another direction, said hydraulic pressure generating means comprising a first controlling valve and a second controlling valve, said first controlling valve supplying hydraulic fluid discharged from said hydraulic pressure source and to one of said hydraulic chambers of said shifting actuator and controlling the pressure of the hydraulic fluid supplied to said one hydraulic chamber for operating said shifting actuator in said one direction, said second controlling valve supplying hydraulic fluid discharged from said hydraulic pressure source to another of said hydraulic chambers of said shifting actuator and controlling the pressure of the hydraulic fluid supplied to said another hydraulic chamber for operating said shifting actuator in said another direction; and flow-controlling means for driving said selecting actuator by controlling a flow of hydraulic fluid discharged from said hydraulic pressure source.

2. A gear ratio selecting apparatus in an automatic vehicle transmission according to claim 1, wherein said first piston portion has a large diameter piston portion, and a small diameter piston portion substantially coaxially connected to said large diameter piston portion, and said second piston portion having a central hole into which said small diameter piston portion is movably inserted.

3. A gear ratio selecting apparatus in an automatic vehicle transmission according to claim 2, wherein an outer diameter of said second piston portion is larger than that of said first piston portion.

4. A gear ratio selecting apparatus in an automatic vehicle transmission according to claim 2, wherein said large diameter piston portion of said first piston portion has a pressure-receiving area facing said first hydraulic chamber, and said small diameter piston portion of said first piston portion has a pressure-receiving area facing said second hydraulic chamber.

5. A gear ratio selection apparatus in an automatic vehicle transmission according to claim 4, wherein said pressure-receiving area of said large diameter piston portion of said first piston portion is larger than said pressure-receiving area of said small diameter piston portion of said first piston portion.

6. A gear ratio selecting apparatus in an automatic vehicle transmission according to claim 1, comprising an automatic deciding means for judging that said shifting fork is in an exacting-inserting step, a synchronizing step, and a squeezing step in synchronizing operation, and for deciding a hydraulic pressure of said hydraulic pressure generating means in such a manner that said shifting fork is moved by working force depending on the particular step which said automatic deciding means judges said shifting fork to be in.

* * * * *